United States Patent
Liu et al.

(10) Patent No.: US 8,838,436 B2
(45) Date of Patent: Sep. 16, 2014

(54) LABELING CONTEXT SLICES TO PRODUCE A STORYLINE FROM MOBILE DEVICE DATA

(71) Applicant: ARO, Inc., Seattle, WA (US)

(72) Inventors: Alan Linchuan Liu, Seattle, WA (US); Kevin Francis Eustice, Seattle, WA (US); Andrew F. Hickl, Seattle, WA (US)

(73) Assignee: Aro, Inc., Seattle, WA (US)

( * ) Notice: Subject to any disclaimer, the term of this patent is extended or adjusted under 35 U.S.C. 154(b) by 0 days.

(21) Appl. No.: 13/950,169

(22) Filed: Jul. 24, 2013

(65) Prior Publication Data

US 2014/0032208 A1    Jan. 30, 2014

Related U.S. Application Data

(60) Provisional application No. 61/675,732, filed on Jul. 25, 2012, provisional application No. 61/675,733, filed on Jul. 25, 2012.

(51) Int. Cl.
| | |
|---|---|
| G06F 17/28 | (2006.01) |
| G06F 17/27 | (2006.01) |
| G06F 17/30 | (2006.01) |
| G06N 5/02 | (2006.01) |
| H04W 4/20 | (2009.01) |
| H04W 4/02 | (2009.01) |
| G06N 99/00 | (2010.01) |
| G06Q 30/06 | (2012.01) |

(52) U.S. Cl.
CPC .............. *H04W 4/02* (2013.01); *G06F 17/2785* (2013.01); *G06F 17/30876* (2013.01); *G06N 5/02* (2013.01); *H04W 4/206* (2013.01); *G06N 99/005* (2013.01); *G06Q 30/0631* (2013.01)

USPC ............................................................ 704/4

(58) Field of Classification Search
USPC ............................................................ 704/4
See application file for complete search history.

(56) References Cited

U.S. PATENT DOCUMENTS

| | | | |
|---|---|---|---|
| 7,421,155 B2 * | 9/2008 | King et al. | 382/312 |
| 2002/0078204 A1 | 6/2002 | Newell et al. | |

(Continued)

OTHER PUBLICATIONS

Adomavicius, G. et al., "Towards the Next Generation of Recommender Systems: A Survey of the State-of-the-Art and Possible Extensions," *IEEE Transactions on KDE*, 2005, pp. 734-749.

(Continued)

*Primary Examiner* — Michael N Opsasnick
(74) *Attorney, Agent, or Firm* — Fenwick & West LLP (57) ABSTRACT

Embodiments create and label context slices from observation data that together define a storyline of a user's movements. A context is a (possibly partial) specification of what a user was doing in the dimensions of time, place, and activity. Contexts can vary in their specificity, their semantic content, and their likelihood. A storyline is composed of a time-ordered sequence of contexts that partition a given span of time. A storyline is created through a process of data collection, slicing and labeling. Raw context data can be collected from a variety of observation sources with various error characteristics. Slicing refines the chaotic collection of contexts produced by data collection into a single consistent storyline composed of a sequence of contexts representing homogeneous time intervals. Labeling adds more specific and semantically meaningful data (e.g., geography, venue, activity) to the storyline produced by slicing.

20 Claims, 5 Drawing Sheets

(56) References Cited

U.S. PATENT DOCUMENTS

| | | |
|---|---|---|
| 2006/0029296 A1* | 2/2006 | King et al. .................... 382/313 |
| 2006/0041828 A1* | 2/2006 | King et al. .................... 715/500 |
| 2006/0050996 A1* | 3/2006 | King et al. .................... 382/312 |
| 2006/0053097 A1* | 3/2006 | King et al. ........................ 707/3 |
| 2006/0217990 A1* | 9/2006 | Theimer et al. .................... 705/1 |
| 2007/0006098 A1* | 1/2007 | Krumm et al. ................ 715/825 |
| 2007/0118498 A1 | 5/2007 | Song et al. |
| 2009/0240647 A1 | 9/2009 | Green et al. |
| 2012/0117006 A1 | 5/2012 | Sathish |
| 2014/0032208 A1* | 1/2014 | Liu et al. ........................... 704/9 |
| 2014/0032358 A1* | 1/2014 | Perkowitz et al. ........... 705/26.7 |
| 2014/0032453 A1* | 1/2014 | Eustice et al. .................. 706/12 |
| 2014/0032572 A1* | 1/2014 | Eustice et al. ................ 707/748 |

OTHER PUBLICATIONS

PCT International Search Report and Written Opinion, PCT Application No. PCT/US2013/051909, Dec. 2, 2013, sixteen pages.

* cited by examiner

LABELING CONTEXT SLICES TO PRODUCE A STORYLINE FROM MOBILE DEVICE DATA

CROSS-REFERENCE TO RELATED APPLICATION

This application claims the benefit of U.S. Provisional Application No. 61/675,732, filed Jul. 25, 2012, entitled "Creating a Storyline from Mobile Device Data," and U.S. Provisional Application No. 61/675,733, filed Jul. 25, 2012, entitled "Recommendation Agents Using Routine, Personality, Learning, and Sharing," both of which are incorporated herein by reference in their entirety.

BACKGROUND

1. Technical Field

The described embodiments pertain to interpreting location data and other data about a person collected from mobile devices and internetworked services.

2. Description of Related Art

Many mobile devices now have the capability of recording location and other information. Having a complete record of when and where the user goes is useful for a variety of applications, including recommendation systems, lifelogging, and goal tracking. However, there are a number of obstacles to building useful applications on top of the kinds of data streams currently available.

First, these data streams are noisy, imprecise, and sometimes unavailable. Global Positioning System (GPS) technology, for example, can be confused by surrounding buildings or other features and is not available indoors. Cell tower triangulation is imprecise, while also unavailable where there are no cell towers. WiFi triangulation is error-prone and also unavailable in the absence of nearby WiFi networks.

Second, sensor readings such as taking satellite or radio readings can cause a significant drain on the device's battery, so they must be done sparingly. Naturally, this increases the uncertainty in the data, with large gaps from one reading to the next.

Third, location data in the form of latitude/longitude readings has no semantic content and is useless for many applications. Because of the noisy nature of the data, translating lat/long into addresses or named locations is difficult, especially in the dense urban areas where most users live.

SUMMARY

Embodiments of the invention include a method, a non-transitory computer readable storage medium and a system for creating context slices that together define a storyline. A context is a (possibly partial) specification of what a user was doing in the dimensions of time, place, and activity. Each of these dimensions may be defined specifically (e.g., location defined by latitude 47.60621, longitude −122.332071) or very generally (e.g., the location "Seattle, Wash."), or entirely unspecified (e.g., omitted or a default value). They may also be ascribed varying degrees of semantic meaning (e.g., "Seattle" contains more semantic information than "47.60621, −122.332071"). A context can represent a stay in a certain location or travel from one place to another. Contexts may have probabilities associated with them. In some cases, contexts may be inferred from evidence rather than known with certainty. Thus, contexts can vary in their specificity, their semantic content, and their likelihood. A storyline is composed of a time-ordered sequence of contexts that partition a given span of time. Thus, a storyline is a single, internally-consistent accounting for what a user was doing at moments in time and where the user was doing it. In one embodiment, a storyline is created through a process of data collection, slicing and labeling.

Data collection is performed by context collectors collecting raw context data. Raw context data can be obtained from a variety of observation sources, sensors, monitors, third party sources, and the like.

Slicing is the process of refining the chaotic, multi-threaded collection of contexts produced by data collection into a single consistent storyline composed of a sequence of contexts representing homogeneous time intervals. A context refiner module groups the context data by combining the observations to create a coherent representation of a user's context, and may attach semantic content to groups or sequences of context data to form storylines. In one embodiment, the slicing process is generally divided into three phases: preprocessing, segmentation, and reconciliation. Preprocessing involves filtering, smoothing, and interpolating data to reduce the effects of noise and uneven sampling rates during data collection. Segmentation involves determining distinct, contiguous series of contexts from the groomed sensor data representing different activities. Reconciliation resolves newly generated context slices with previously generated context slices.

Labeling is the process of adding more specific and semantically meaningful data to the storyline produced by slicing. Labeling may add geography (such as the context's city or neighborhood), venue (public places, businesses, or personally significant places like "home"), and/or activity (such as "working", "eating", or "going to see a movie"). In one embodiment, the labeling process is generally divided into three phases: label candidate search, label candidate ranking, and label application. In label candidate search, label sources are queried to discover possible labels based on the slice context. In label candidate ranking, the likelihood of each label candidate is evaluated based on the slice context and ranked according to likelihood. In label application, labels deemed sufficiently likely can be applied to label the slices.

In one embodiment, after the data collection, slicing, and labeling process has created a storyline, the storyline is stored. The storyline may be presented to the user or accessed for further processing by various mobile applications or web applications, for example.

Embodiments of the computer-readable storage medium store computer-executable instructions for performing the steps described above. Embodiments of the system further comprise a processor for executing the computer-executable instructions.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict embodiments of the present invention for purposes of illustration only. One skilled in the art will readily recognize from the following description that alternative embodiments of the structures and methods illustrated herein may be employed without departing from the principles of the invention described herein.

DETAILED DESCRIPTION

Embodiments of the invention enable the creation and labeling of context slices from observation data that together define a storyline of a user's movements. A context is a (possibly partial) specification of what a user was doing in the dimensions of time, place, and activity. Contexts can vary in their specificity, their semantic content, and their likelihood. A storyline is composed of a time-ordered sequence of contexts that partition a given span of time. A storyline is created through a process of data collection, slicing and labeling. Raw context data can be collected from a variety of observation sources with various error characteristics. Slicing refines the chaotic collection of contexts produced by data collection into a single consistent storyline composed of a sequence of contexts representing homogeneous time intervals. Labeling adds more specific and semantically meaningful data (e.g., geography, venue, activity) to the storyline produced by slicing. Accordingly, the storyline data is then available to offer a historical perspective to the user or for further processing in other applications.

System Overview

Figure 1:
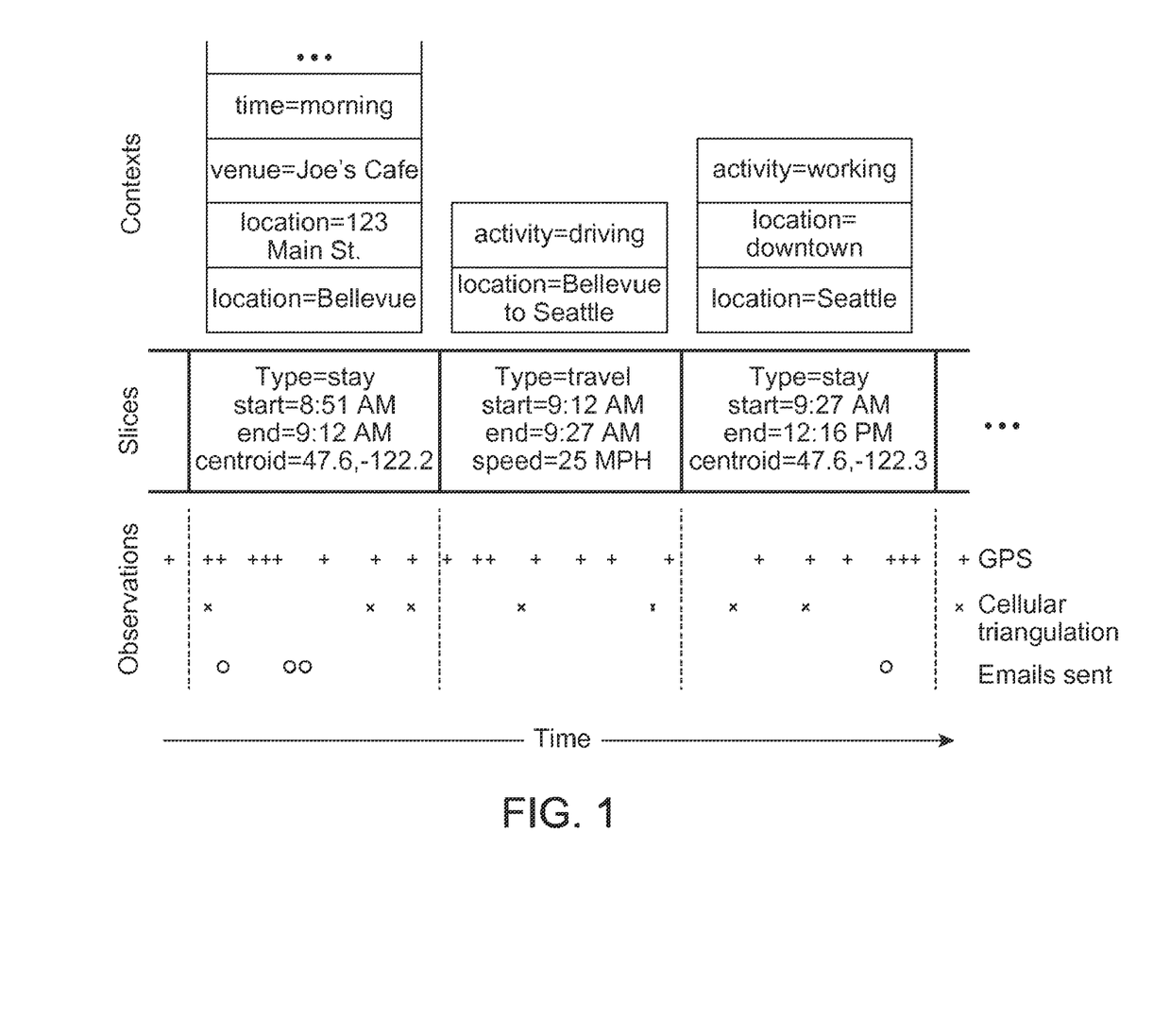
FIG. 1 is a diagram illustrating the relationship of sensor data, slices, and contexts, in accordance with an embodiment of the invention.
Figure 2:
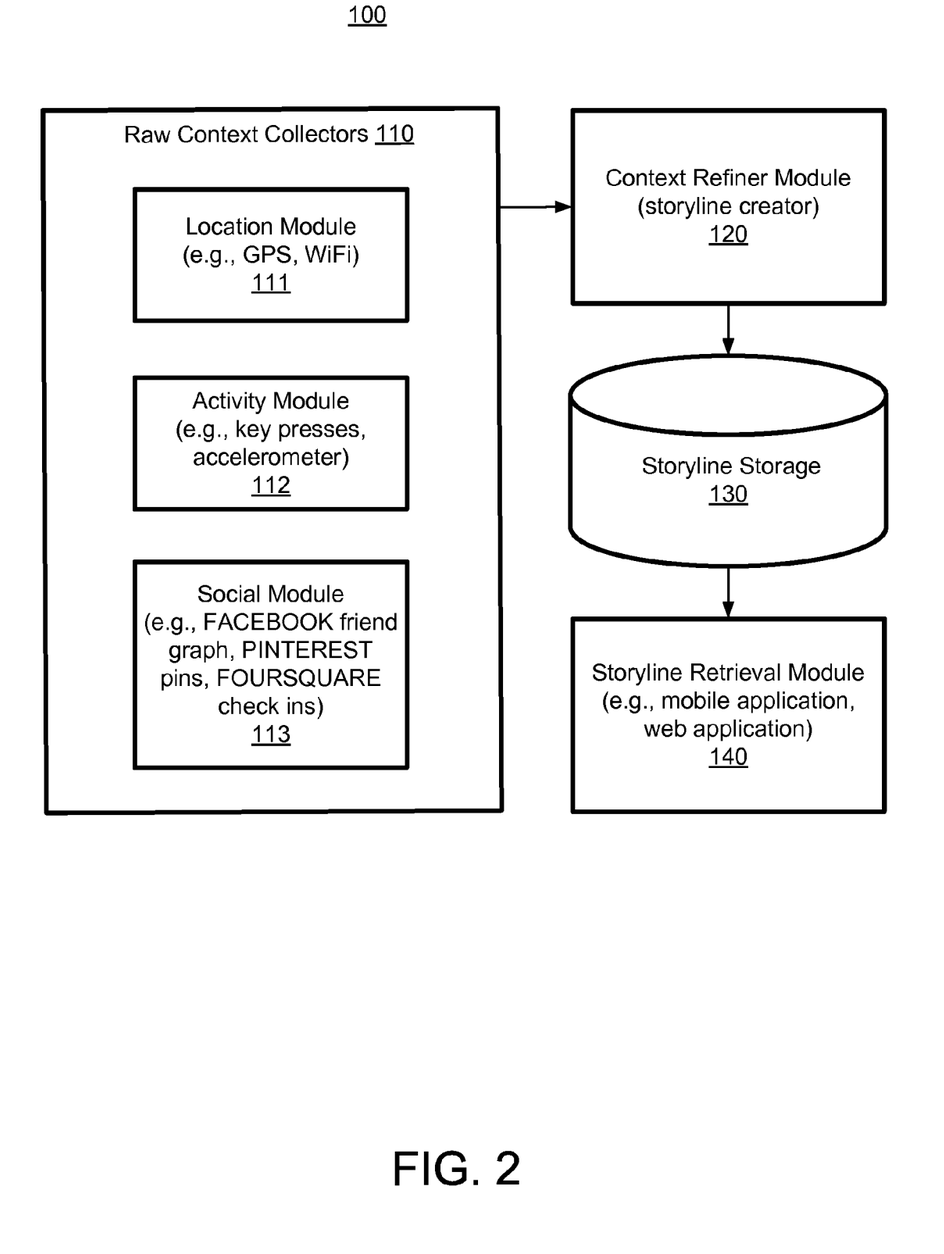
FIG. 2 is a block diagram illustrating the system environment for creating and using storylines in accordance with an embodiment of the invention.

FIG. 2 is a diagram illustrating the relationship of sensor data, slices, and contexts, in accordance with an embodiment of the invention. FIG. 2 illustrates observations, which are the collections of sensor data from a mobile device. In this example, the observations include Global Positioning System readings, Cellular triangulation signals, and emails sent from the device. The points along the time axis at which these observations are collected are marked. As a result of these observations, the user's time can be divided into a sequence of slices. In this example, each slice has a type and a start and end time. In this example, the type is either "stay" or "travel" and the start and end times establish the limits or boundaries of the slice. For "stay" type slices, the slice also has a centroid location, and for "travel" type slices, the slice also has a speed of the travel. In this example, based on the division of observations into time slices, a variety of metadata representing contexts have been attached to the slices. The metadata may describe the dimensions of time, place, and activity of the user at various levels of generality. For example, the first slice is associated with a place dimension of the context at various levels of generality/specificity: at a city level, a street address level, and a venue level.

One use of storyline data is to offer a historical perspective to the user, who may peruse the storyline to view his/her previous activities. Another use of storyline data is for further processing into interesting aggregations, e.g., showing how often certain activities were performed within some time period, in accordance with another embodiment of the invention. This information can be useful for increasing self-awareness or goal tracking purposes, e.g., seeing how much time was spent exercising or eating out at restaurants per month.

FIG. 2 is a block diagram illustrating a system environment 100 for creating and using storylines, in accordance with an embodiment of the invention. The system environment 100 includes one or more raw context collectors 110, a context refiner module 120, a storyline storage 130, and a storyline retrieval module 140. In one embodiment, the entities of the system environment may be contained on a single processing node, such as a user's mobile device, and in another embodiment, the entities of the system environment may be divided between the user's mobile device and a centralized processing node to decrease the processing requirements of the mobile device. An example distributed embodiment is one where the raw context collectors 111 are located on the user's mobile device and data is sent to a central device of context refinement, storage, and retrieval.

The raw context collectors 110 collect raw context data from observation sources, sensors, monitors, third party sources, and the like. A raw context represents a single observation and so is generally very specific, often carries little semantic information on its own, and is of high probability. Naturally, different observation sources may have greater degrees of noise and uncertainty or may inherently include semantic information. In the example illustrated in FIG. 1, the raw context collectors 110 include a location module 111, an activity module 112, and a social module 113, but different and/or other context collectors 110 may be included in other embodiments. For example, in various embodiments, the context collectors include sensors for measuring device orientation (e.g., a compass), magnetic fields, user heart rate, and user stress level, as well as modules for audio and visual sampling of the user's environment.

Examples of location module 111 include a GPS receiver, and a Wi-Fi receiver that enable the location module 111 to determine an absolute or relative location of the user's mobile device, within a margin of error. Examples of the activity module 112 include, a monitor of key presses that determines when a user is typing or otherwise interacting with the user's mobile device, and an accelerometer that measures the acceleration forces on the mobile device to determine movement and movement patterns of the mobile device. Examples of social module 113 include a FACEBOOK friend graph, PINTEREST pins, FOURSQUARE check ins, and other social media data that identify a user's social acquaintances, activities, and locations.

The context refiner module 120 receives the raw context data from the raw context collectors 110. The context refiner module 120 groups the context data by combining the observations to create a more coherent representation of the user's context. The context refiner module 120 may also attach semantic content to groups or sequences of context data to form storylines. In some embodiments, the context refiner module 120 includes a plurality of context refiner sub-modules (not shown); one for each type of context data received from the raw context collectors 110. Each context refiner sub-module groups context data by combining the observations from the corresponding raw context collector 110 into slices in order to create a more coherent representation of the user's context indicated by the specific type of context data the sub-module is operating on. In one such embodiment, the context refiner module 120 includes an additional refiner sub-module (not shown) that analyzes the multiple streams of contexts generated by the other context refiner sub-modules to detect overlapping slices and generate combined slices containing context information from the corresponding overlapping slices.

The storyline storage 130 receives the storylines formed by the context refiner module 120 and stores them. Then, a storyline retrieval module 140 can access the stored storylines from storage 130. Examples of storyline retrieval modules 140 include mobile applications and web applications that use the storylines stored in storage 130. An example of an application that uses a storyline is a mobile phone application that displays the user's history, showing the user the places the user has stayed and the travel between the stays. The process of grouping context data and attaching semantic content to form storylines will be described in detail in the section below.

Storyline Creation Process

Embodiments of the invention divide the process of storyline creation into three phases: data collection, slicing, and labeling. These phases are illustrated in the flow chart of FIG. 3, and described in detail in this section.

Data Collection 301

Figure 3:
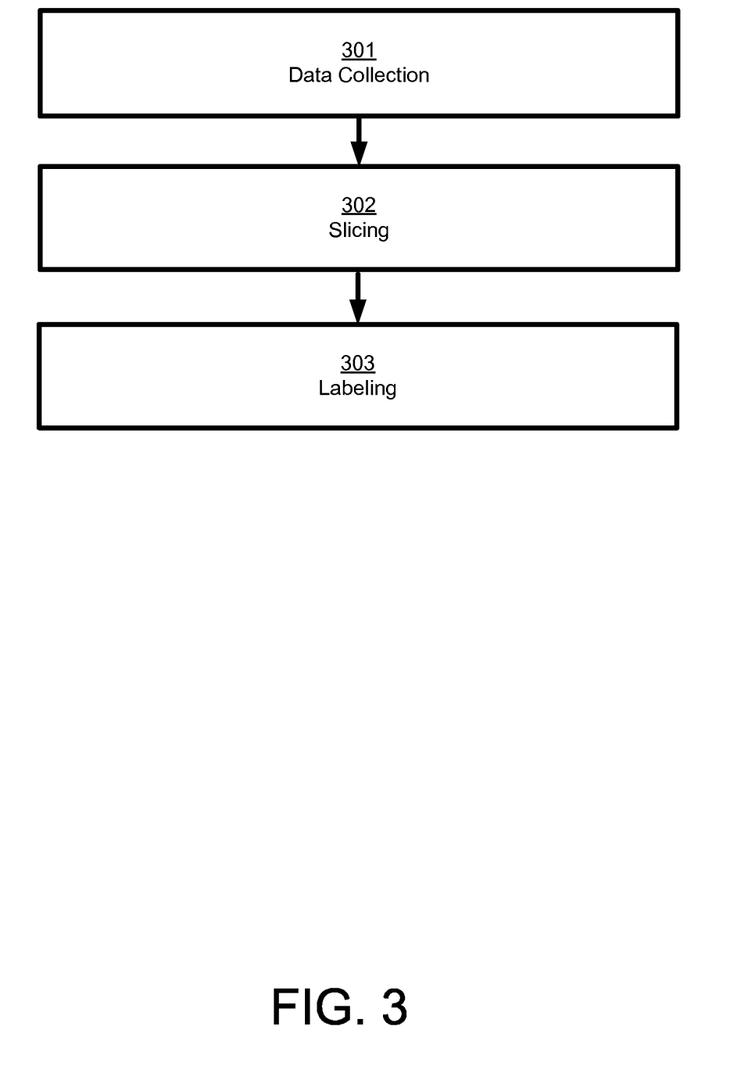
FIG. 3 is a flow chart illustrating a storyline creation process in accordance with an embodiment of the invention.

Data collection 301 involves accessing the various sources of information and observations of user behavior, optionally transporting their data to servers for analysis and storage (to offload CPU load and reduce battery usage), and translating the data into a collection of raw contexts for additional analysis. These observations may come from a variety of sources, including but not limited to the following:

- Location technologies (e.g., GPS, cell tower triangulation, Wi-Fi location), typically embedded in mobile devices like smartphones. The location technologies may be included, for example, in the location module 111 illustrated in FIG. 2.
- Activity data such as accelerometer data from mobile devices and device interaction notices (e.g. taps, key presses, power on). The activity data may be collected, for example, by the activity module 112 illustrated in FIG. 2.
- Ambient data from the user's environment (e.g., sound, temperature, or light intensity).
- Biometric data such as the user's skin temperature, galvanic skin response, heat flux, and heart rate. This data may be used to calculate caloric burn, stress level, sleep quality, and other indicators of the user's physical state.
- Social data from any networks or applications the user may use, such as FACEBOOK, TWITTER, FOURSQUARE, FLICKR, or PINTEREST, as well as personal communication applications like email and text messaging. The social data may be collected, for example, by a social module 113 illustrated in FIG. 2. In one embodiment, the social data is made available to the social module 113 through application programming interfaces (APIs).
- Schedule data, such as from the user's calendar application.
- Explicit annotation created by the user to inform the system of a location (e.g., a "check in" at a baseball stadium) or activity (e.g., marking the time boundaries of a jog to track fitness goals).

Data collection 301 may be run as a constant on-going process, with different techniques appropriate to different sources. Alternatively, data collection 301 may be run periodically at an interval appropriate for the application.

Slicing 302

One challenge with data collection 301 described above is that multiple sources of observation data may result in a collection of contexts that contain conflicting information. For example, an observation from the user's calendar may place him at a meeting downtown, while GPS observations may show him to be at the beach. Resolving these inconsistencies is key to the interpretation of the data. Slicing 302 is the process of refining the chaotic, multi-threaded collection of contexts produced by data collection into a single consistent storyline composed of a sequence of contexts representing homogeneous time intervals. These homogeneous time intervals generally represent either a stay at one place or a process of travel from one place to another. In one embodiment, place information may be refined, in that each stay context defines an area that includes most of the individual points observed during that time. Travel contexts will generally have a start and end point, with some definition of the route between them (e.g., waypoints). In one embodiment, travel slices may be further annotated with mode of conveyance (such as driving, walking, flying, or riding a bus), and travel slices may be segmented into distinct slices for different modes of conveyance. For example, a trip involving a drive to the airport, a flight to another city, and a taxi to a hotel might be separated into three distinct travel slices. In another embodiment, no additional semantic meaning or activity information is added during slicing 302. Other types of data can be used to produce other types of slices, such as slices representing a period of consistent activity. For example, an activity like "shopping" may be represented by a longer-duration slice that overlaps with multiple location slices representing stays at different retail businesses as well as travel between those businesses. Conversely, an activity like "sleeping" may span only part of a stay at home. As another example, a biometric slice such as "high caloric burn" may cover part of a visit to the park as well as time at the gym.

Figure 4:
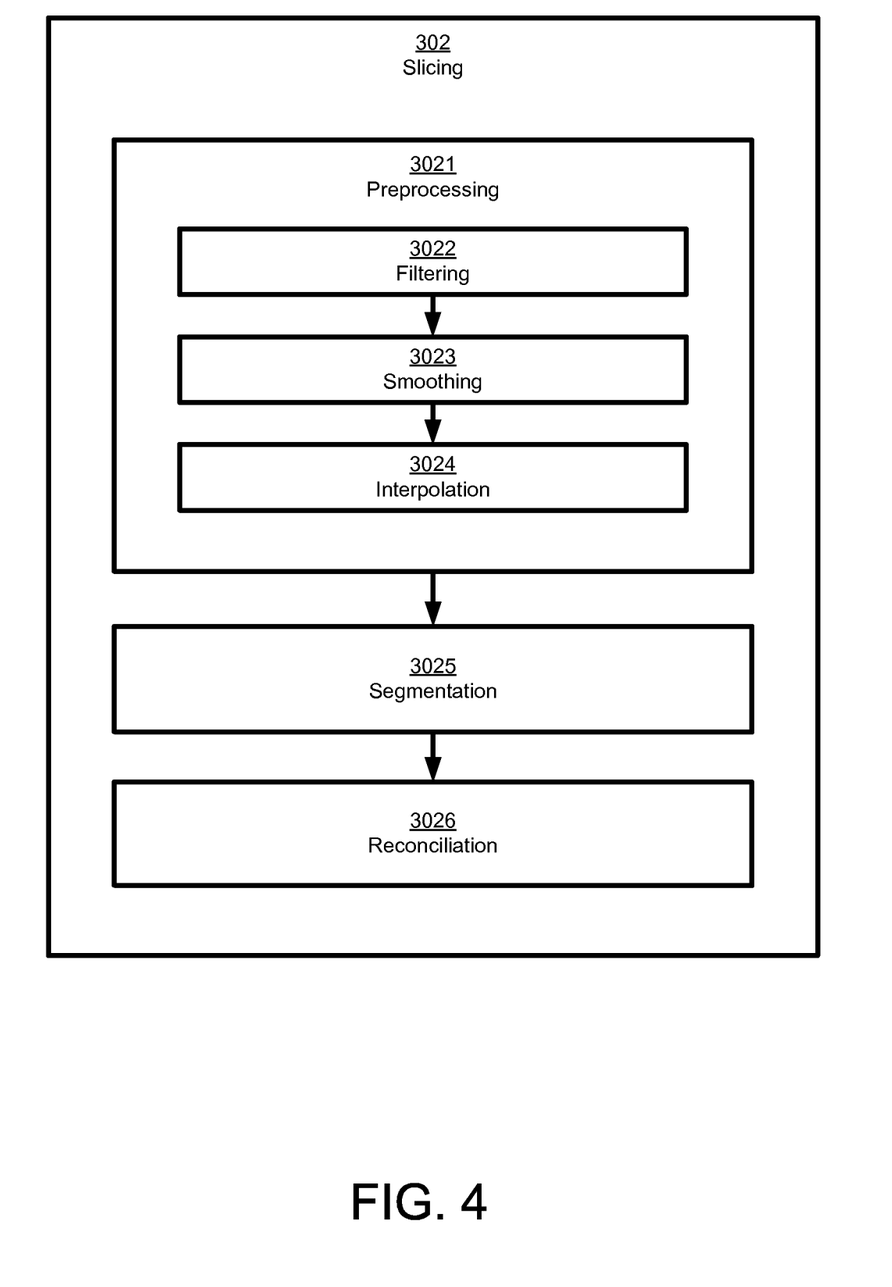
FIG. 4 is a flow chart illustrating a process of slicing in accordance with an embodiment of the invention.

Embodiments of the invention divide the process of slicing 302 into three phases: preprocessing 410, segmentation 420, and reconciliation 430. Each of these phases is described in detail in this section, with reference to the flow chart illustrated in FIG. 4. The steps of FIG. 4 are illustrated from the perspective of the context refiner module 120 performing the method. However, some or all of the steps may be performed by other entities and/or components. In addition, some embodiments may perform the steps in parallel, perform the steps in different orders, or perform different steps.

Preprocessing 3021

Since raw context data input into the slicing 302 process come from a variety of sources with varying degrees of inaccuracy, the raw context data are systematically groomed into a suitable form for later steps to minimize the amount of error in the output. In one embodiment, preprocessing 3021 involves a combination of filtering 3022, smoothing 3023, and interpolation 3024.

Filtering 3022. Filters on raw context data eliminate from consideration raw context data that are deemed more inaccurate than some desirable threshold. The value of the filter threshold can be sensor-specific, due to different sensor error characteristics. For example, a GPS device's data uncertainty is calculated by physical factors related to the timing of signals received from the device's acquired satellites, so it can report a reliable estimate of sensor inaccuracy. In contrast, reported uncertainty is less reliable with location technology based on cell tower or Wi-Fi triangulation, which lack the measurement precision necessary to account for fluctuations in wireless signal strength, therefore the threshold for filtering 3022 those contexts may be higher. When using any location technology, the amount of filtering 3022 will depend on its expected error characteristics, and the error characteristics are expected to vary between sources of data. Optionally, default threshold values for filters may be set system-wide, set per sensor type, or based on user preferences. In addition to filtering 3022 by location technology, physically unlikely readings (e.g., traveling at higher speeds than possible) may also be filtered.

Smoothing 3023. It is also helpful to later slicing phases for context grooming to smooth sequences of contexts from the same sensor when each individual context is noisy. Noise characteristics are hardware dependent, so the smoothing 3023 of each sensor should be parameterized to limit the noise expected from that sensor. For example, a certain accelerometer may generate noisy contexts at a high sampling rate, characterized by large magnitude swings in all axes. One way to smooth such data is to compute an average of the magnitude values over a time window and then output the smoothed magnitude values at a less frequent sampling rate. Smoothing 3023 is also used when different sensors conflict. For example, if there is minimal change in values across a series of accelerometer readings, it indicates that a device was immobile, which could contradict a series of location readings that would otherwise suggest the device was wandering due to inaccurate location technology. In general, the degree of smoothing 3023 will depend on the variability in data noise from each particular location technology.

Interpolation 3024. Uneven sampling rates can also be due to power conservation, where a device chooses to go into a low-power, low sampling rate state, or is forced to by a governing operating system such as a mobile phone OS. It is common for sensors to be configured to increase sampling when the environment is changing, and to decrease it when the environment (from the sensor's perspective) is static. As slicing 302 occurs over a finite window of time, a decreased sampling rate could lead to relevant context data falling outside the window. Therefore, it is desirable in some cases to interpolate less frequent context data to ensure that the later phases of slicing 302 have sufficient data to analyze. Interpolation 3024 generates virtual context data between sensed context data. For example, when there is a gap between two location contexts, a number of interpolated context data points may be generated that correspond to locations between the two endpoints. Interpolation 3024 runs into the risk of adding contexts that should not exist. For example, if a sensor is not functional and therefore not reporting, a gap in contexts should not be interpolated. To prevent invalid interpolation 3024, sensor data payload may include an indication that there has been an interruption in contexts since the last time a sensor generated context. This may be the default behavior whenever a sensor is (re)started for data collection by the controlling data collection process. In addition, if there is an exceptionally long gap between context data from sensors, it may indicate an interruption even if the sensors fail to set the flag and would be treated as such.

Segmentation 3025

Segmentation 3025 involves determining distinct, contiguous series of slices from the groomed sensor data representing different activities. For example, the simple day of a user who is an office worker could be segmented into a stay slice located in the morning at her domicile, then a commute to work travel slice, a stay slice at an office, then a commute back home travel slice, followed by a stay slice in the evening at her domicile.

There are a variety of algorithms to segment the input raw context data into stays, travels, and gaps. For example, k-means clustering can be applied to find clusters of contexts (by location, or a distance function combining location and time). Stay slices can be distinguished from travel slices by the dispersion of location context and/or velocity data. Because k-means has fundamental limitations, other more sophisticated clustering algorithms can be used additionally or alternatively to extract slices.

Besides clustering, segmentation 3025 can also be performed by applying time-series analysis algorithms, using the variance of a sliding window of input contexts to detect inflection points in the distribution. When the variation across a subsequence of input context data differs from a subsequence before it, the algorithm divides the two subsequences into slices that can then be classified as a stay or travel. For example, a stay is distinguishable from a travel by the low amount of variance in each individual input context in the stay sequence to its centroid, the geographic average location.

Because there are a variety of algorithms that can be applied to segmentation 3025, each with different features and limitations, it is also possible to combine their resulting outputs with a meta-segmenter. This meta-segmenter can pick and choose slices output with the highest associated probability among all constituent segmentation algorithms.

Segmentation 3025 can also be followed by filter and merge steps that smooth the output slices. Filters can remove short slices with more uncertainty associated with the contexts included therein, e.g., those with few actual sensor observations, and merge adjacent segments that are likely to be the same activity. The thresholds on minimum required observation uncertainty or distance from adjacent segments for filtering and merging can be parameterized to control the false positive rate (groups of raw context data that should not have been segmented) compared to the false negative rate (groups of raw context data that should have been segmented but were not).

Reconciliation 3026

In one embodiment, the final phase of slicing 302 deals with resolving newly generated slices with existing contexts generated from a previous slicing 302 run. While this reconciliation 3026 is optional—if it were computationally feasible to run slicing 302 on an entire raw context set, the brand new contexts could simply replace the older ones—in some cases reconciliation 3026 provides desirable qualities for the purpose of presentation. For example, it is desirable not to change contexts and slices in a user's history that have been previously displayed to the user, unless new data is in significant conflict, because the instability in data shown to the user would appear inconsistent. Instability is even less desirable in cases when the user has performed some operation on a previous context or slice, such as manually labeling or otherwise attaching metadata to it, that the subsequent slicing 302 run would overwrite. As such, there are rules governing when new slices and contexts can replace preexisting data in a user's history.

One way to limit the scope of changes between new and preexisting slices is to specify a time window within which preexisting data may be changed or replaced. Any data outside the window (i.e., older than a certain age), would be left unchanged in later slicing 302 runs. Contexts from newer slices are then integrated into the eligible preexisting slices by comparing type (stay or travel) and time spans. If a new slice is of the same type and begins and ends at approximately the same time as an existing slice, it could retain the same metadata of the existing slice, including any identifier labels (ids) and contexts. When a new slice and old slice overlap in time but conflict in type, the process can prefer the new slice except when there has been manual intervention, for example when a user has already interacted with the existing slice or confirmed it in some way using a user interface. Finally, the last slice is most likely to have changed due to new data, and could have its ending time extended if it aligns with a new slice starting at a time near its own start time, or completely replaced if the type changed (if a previously presumed stay were actually the beginning of a travel slice, for instance).

Labeling 303

Labeling 303 is the process of adding more specific and semantically meaningful data to the slices produced by slicing 302. In one embodiment, some or all of these labels are themselves contexts associated with the slices. In particular, labeling 303 adds geography (such as a slice's city or neighborhood), venue (public places, businesses, or personally significant places like "home"), and activity (such as "working", "eating", or "going to see a movie"). Note that the process of labeling 303 may suggest a revision in slicing 302, such as when the labeling 303 process determines that a user was eating and then seeing a movie at the theater next door, while the slicing 302 phase represented both activities as a single slice, prompting the single slice to be split into two successive slices, taking place at distinct venues.

A slice can be labeled using identifiers from predefined data sets, such as public venue records, or automatically generated, for example using a reverse geocoding system that converts latitude and longitude coordinates into an approximate street address. The labeling 303 process uses these data sources to apply probable labels to each slice. Some labels are exclusive while others may coexist alongside one another. Example data sources for the labeling 303 process include:

Public venue database—a set of geographically annotated public venue names, such as businesses, public spaces, or landmarks. The venue data should be able to be queried geographically (e.g., to find likely venues within some specified distance of the slice's observed location observations), therefore it should have a location represented either as a single point (latitude, longitude, altitude) or as a set of points that defines or approximates its shape. The venue may also contain a unique identifier, which is useful, for example, to use to associate the venue with manually entered observations from the user. In addition to location and name, the data entry for the venue may contain other metadata such as address, business hours, categories describing the type of venue, and reviews useful to present back to the user. Because the set of public venues changes over time, this database may be configured to receive updates whenever available.

User-specified database of places—a set of manually or automatically generated locations considered private to the user, identified by location and optionally by name and other metadata the user chooses to attach. The purpose of this database is to provide labels for slices that cannot be associated with public venues due to gaps in coverage. For example, many homes are not public venues and therefore would not be found in any public venue database, so a user may need to manually label his/her home. Labels such as "home" and "work" can also be automatically inferred.

A set of additional labels associated with certain venue metadata such as a venue category. These labels could include descriptions of activities commonly applicable to the venue category (e.g., "jogging" at public parks or "dining out" at restaurants). These labels may be either predefined or automatically extracted, e.g., by analyzing the texts of some corpora such as online reviews. As with venue or place, the user can manually apply an activity label to a slice, or the labeling 303 process can infer it based on a model of likelihood given the input context.

Public and user-specific calendar data—listings of public events and private appointments that can then be applied to matching, consistent slices.

A database to store user corrections to automatically applied labels that were made by the system in error. This database has multiple uses. First, in the case of continuous slicing 302 and labeling 303, the correct label can be used during reconciliation 3026 to prevent incorrect labels from being reapplied. Second, the presence of the correction indicates with high confidence what the correct description for the slice is, and can influence future automated labeling 303 decisions for similar slices. The user corrections may be stored, for example, in storyline storage 130 or similar data store accessible by the context refiner module 120.

Conceptually, it is possible to view the labeling 303 process as a collection of subprocesses responsible for outputting one type of label at a time. Labels of different types can then be run simultaneously on slices, or chained when one type of label is triggered by the presence of another (i.e., activities that are category- or venue-specific are only considered when a preceding labeling 303 subprocess applies a corresponding category or venue label, respectively, to the slice). In general, the labeling 303 process can be broken into three phases: label candidate search 3031, label candidate ranking 3032, and label application 3033, illustrated in FIG. 5.

Label Candidate Search 3031

Figure 5:
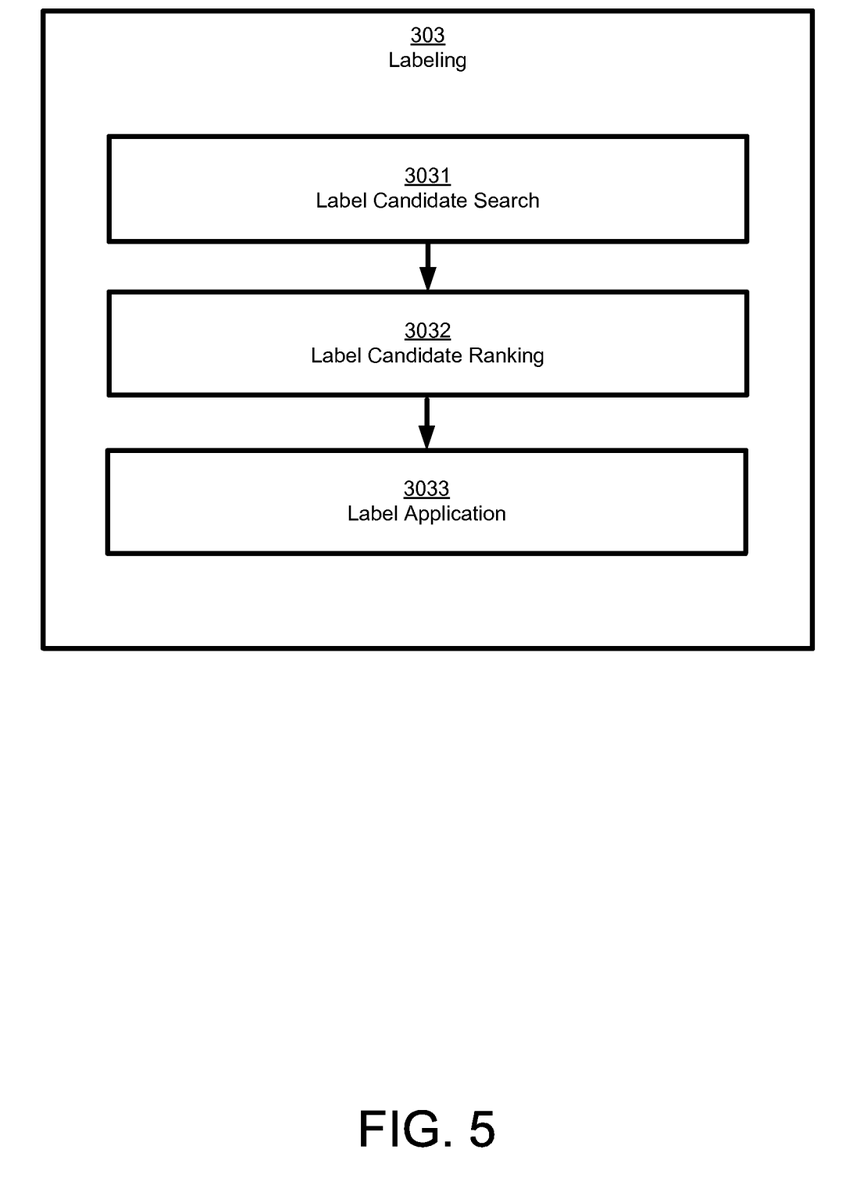
FIG. 5 is a flow chart illustrating a process of labeling in accordance with an embodiment of the invention.

In the label candidate search 3031 phase, the label sources are first queried to discover possible labels based on the slice's existing contexts. The following provides examples of how various label types can be searched.

Venues and places are found based on the slice's location, which by definition is a consistent estimate of a user's location over a period of time. However, there is a degree of uncertainty when using the associated slice location. Essentially, raw sensors providing locations are imprecise. The label candidate search 3031 phase does not rely on the exact location represented by the slice, but instead expands the search within some radius calculated as an estimate of the uncertainty. For example, if a slice's location was calculated using Wi-Fi triangulation, the triangulation error is often in the tens to low hundreds of meters, so the search process may query for venues and places centered at the slice location within two hundred meters.

Events and appointments can be found based on the slice's location and time boundaries. An event at a venue would be matched against the overlapping time boundaries between the event and the slice. Appointments are also matched against location and time. Because event and appointment time boundaries are imprecise, and slice time boundaries may be imperfect, the slice's time boundaries do not need to exactly match those of an event or appointment. Similarly, the slice location does not need to be an exact match either. The label candidate search 3031 finds possible events and appointments within the likely uncertainty radius of the slice location.

Several methods may also be used to find candidate activities. For example, based on the category and/or venue labels already applied to the slice, the label candidate search 3031 process can bring up associated activity labels. As another example, the slice context can be compared to similar slices in the past if the user had previously labeled activities manually. For example, if a user previously labeled an activity at the same venue or a venue in the same category as the slice that has not yet been labeled with an activity, that activity would be considered as a candidate for labeling the slice.

Label Candidate Ranking 3032

Once a set of label candidates of a given type are found, the likelihood of each one given the contexts already associated with the slice is evaluated. In one embodiment, the likelihood of each label is computed and the labels are ranked. There may also be a threshold for likelihoods, such that if no label is deemed likely enough, none is applied to the slice at all—this avoids the case of having a label (e.g., an incomplete label) applied inappropriately. In one implementation, slices are constrained to only having one label of some types (e.g., venue labels), and the top-ranked label meeting the minimum likelihood threshold is applied to the slice. For other label types, multiple labels can be valid for a single slice, and all labels meeting the minimum threshold of likeliness are applied.

Likelihoods are calculated by scoring a candidate label given the contexts already associated with a slice. A model is defined to be an algorithm for computing likelihoods given slice context. Models treat the various aspects of a slice context as features. Some example features include:

Slice location—while the label candidate search 3031 also uses location to discover the set of eligible labels to apply, a ranking model can further determine the likelihood of a label given its distance to the slice location, or relative likelihood between several candidates (e.g., a venue that is significantly farther from the slice location would to considered less likely, but two venues that differ only a small amount in distance from the slice location may be considered equally likely given the location context, all else being equal).

The particular user whose slice is being labeled—since users have individual differences, a model may use specific algorithms tailored to each to achieve the best labeling accuracy. One example of how an individual user could affect label candidate ranking 3032 is for the ranking process to use the user's accumulated history of slices and labels, some of which the user may have explicitly confirmed to be accurate. Labels that occurred more often in the user's history may be considered more likely when labeling new contexts.

The beginning and end stay times—since different labels are more likely to occur at different times (e.g., restaurants at meal times, rock concerts in the evenings), and events, appointments and activities last for different lengths of time (e.g., movies between 1.5-3 hours), the likelihood of a particular label can depend on the corresponding day and time range.

Besides the context provided by the slice, models can use other sources of information to inform the likelihood estimate. Some example information sources include:

Venue hours of operation—used to reduce the likelihood that a venue be applied to a slice when it's known to be closed during some significant portion of the slice's time boundaries.

Venue popularity—e.g., relative popularity over all time compared to other venues, or historic popularity at the time of day, day of week, etc, which can indicate the likelihood that the label is applicable given the slice's time boundaries. If the duration of the slice is known, it can also be compared to the distribution of stay durations at the venue to determine whether the length of time spent in one place is consistent with other visits to the candidate venue.

Category popularity—used when data is scarce about specific venues in the candidate list. This can also be relative to time of day, day of week, etc., and can also include typical stay durations so that the slice's time boundaries factor into the likelihood calculation.

Routine—considering how often in the past the user has similar slices with the candidate label, can determine whether a certain label is more likely (if there are many such instances) or less likely (if there are few or no instances). Routine is not limited to only considering a specific user's historical patterns. Users might be clustered into cohort groups, or even aggregated into a global routine model, depending on data scarcity due to limited interactions with the system or the area where the slice occurs.

Social interest—some users are more likely to visit a venue if their friends recommended it, if they have been there before, or were labeled as being there during an overlapping time period by the labeling 303 process. Some of this information is available through existing social network APIs, for example recommendations may be based off of a friend "liking" the venue on FACEBOOK. Information about a user's friends visits to a venue can also come from a friend "checking in" or retrieved from the contextual history storage 130 (in embodiments where the storyline storage is centralized).

Label Application 3033

One or more models can be run to process a slice's context(s) into labels, which are applied in label application 3033. Conceptually, multiple models can be represented by a single meta-model that runs the appropriate features through its composing models. Once the meta-model outputs probabilities, labels deemed sufficiently likely are applied to the slice. In one embodiment, labels that are not deemed to be sufficiently likely can still be surfaced as options to the user should he/she wish to alter the label set by adding new labels, with the label candidate ranking 3032 intact. In such cases, it is not necessary for the same meta-model to produce the label candidate ranking 3032—different meta-models can rank labels differently to produce whatever is specified by the system design of a particular embodiment.

In one embodiment, automatic label application 3033 does not require that every label is ranked solely by likelihood. For example, when users interact with the label candidates (e.g., to manually apply labels), it can be desirable to present candidate labels in different orders to make finding desired labels easier. For example, an alphabetical order or a hybrid order that incorporates both likelihoods and lexicographical positions can be used. Once labels are applied to slices, the additional contextual data is presentable to the user and available for further processing in a variety of forms.

Once labels are applied to slices, the new storyline data is presentable to the user and available for further processing in a variety of forms. As described above, one use of storyline data is to offer a historical perspective to the user, who may peruse the storyline to view his/her previous activities. Another use of storyline data is for further processing into interesting aggregations, e.g., showing how often certain activities were performed within some time period, or for processing by other software applications.

Additional Configuration Considerations

A computer is adapted to execute computer program modules for providing the functionality described herein. As used herein, the term "module" refers to computer program logic utilized to provide the specified functionality. Thus, a module can be implemented in hardware, firmware, and/or software. In one embodiment, program modules are stored on a storage device, loaded into memory, and executed by a processor.

Embodiments of the physical components described herein can include other and/or different modules than the ones described here. In addition, the functionality attributed to the modules can be performed by other or different modules in other embodiments. Moreover, this description occasionally omits the term "module" for purposes of clarity and convenience.

Some portions of the above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. A method of labeling context slices of a storyline of a user's movements, the method comprising:
   receiving a plurality of context slices derived from associated context data collected from a plurality of observation sources; and
   for each of the plurality of context slices:
      determining an uncertainty in a location of the slice based on a type of observation source from which the associated context data originated;
      identifying a set of candidate labels based on context data associated with the context slice, each candidate label matching the location of the slice within the predetermined uncertainty, the candidate labels each comprising semantic data describing the context data associated with the context slice, the semantic data selected from a group consisting of geography, venue, and activity;
      ranking the set of candidate labels by likelihood;
      applying one or more of the candidate labels to the context slice; and
      storing a correspondence between the applied one or more labels and the context slice.

2. The method of claim 1, wherein the set of candidate labels are from public venue records, a user-specified database of places, a database of descriptions of activities commonly applicable to venue categories, calendar data, and user corrections to automatically applied labels.

3. The method of claim 1, wherein identifying a set of candidate labels comprises searching for candidate labels for geography and venue based on the context slice's location.

4. The method of claim 1, wherein identifying a set of candidate labels comprises searching for candidate labels for events based on the context slice's location and time boundaries.

5. The method of claim 1, wherein identifying a set of candidate labels comprises searching for candidate labels for activities based on the context slice's labeled venue.

6. The method of claim 1, wherein identifying a set of candidate labels comprises searching for candidate labels for activities based on a label applied to a similar slice in the past.

7. The method of claim 1, wherein ranking based on likelihood comprises determining a likelihood based on a score of a model of features of the context slice including slice location, user, and beginning and end times of the context slice.

8. The method of claim 7, wherein the model is further informed by venue hours of operation, venue popularity, category popularity, user routine, or social interest.

9. The method of claim 1, further comprising providing a plurality of candidate labels to a user for possible selection.

10. The method of claim 1, further comprising providing the storyline for display to the user, the storyline including the plurality of labeled context slices.

11. A non-transitory computer-readable storage medium having computer program instructions embodied therein for labeling context slices of a storyline of a user's movements, the computer program instructions comprising instructions for:

receiving a plurality of context slices derived from associated context data collected from a plurality of observation sources; and for each of the plurality of context slices:

determining an uncertainty in a location of the slice based on a type of observation source from which the associated context data originated;

identifying a set of candidate labels based on context data associated with the context slice, each candidate label matching the location of the slice within the determined uncertainty, the candidate labels each comprising semantic data describing the context data associated with the context slice, the semantic data selected from a group consisting of geography, venue, and activity;

ranking the set of candidate labels by likelihood;

applying one or more of the candidate labels to the context slice; and storing a correspondence between the applied one or more labels and the context slice.

12. The computer-readable storage medium of claim 11, wherein the set of candidate labels are from public venue records, a user-specified database of places, a database of descriptions of activities commonly applicable to venue categories, calendar data, and user corrections to automatically applied labels.

13. The computer-readable storage medium of claim 11, wherein the instructions for identifying a set of candidate labels comprise instructions for searching for candidate labels for geography and venue based on the context slice's location.

14. The computer-readable storage medium of claim 11, wherein the instructions for identifying a set of candidate labels comprise instructions for searching for candidate labels for events based on the context slice's location and time boundaries.

15. The computer-readable storage medium of claim 11, wherein the instructions for identifying a set of candidate labels comprise instructions for searching for candidate labels for activities based on the context slice's labeled venue.

16. The computer-readable storage medium of claim 11, wherein the instructions for identifying a set of candidate labels comprise instructions for searching for candidate labels for activities based on a label applied to a similar slice in the past.

17. The computer-readable storage medium of claim 11, wherein the instructions for ranking based on likelihood comprise instructions for determining a likelihood based on a score of a model of features of the context slice including slice location, user, and beginning and end times of the context slice.

18. The computer-readable storage medium of claim 17, wherein the model is further informed by venue hours of operation, venue popularity, category popularity, user routine, or social interest.

19. The computer-readable storage medium of claim 11, the instructions further comprising instructions for providing a plurality of candidate labels to a user for possible selection.

20. The computer-readable storage medium of claim 11, the instructions further comprising instructions for providing the storyline for display to the user, the storyline including the plurality of labeled context slices.

* * * * *